US006478702B2

United States Patent
Borghi et al.

(10) Patent No.: US 6,478,702 B2
(45) Date of Patent: Nov. 12, 2002

(54) CONTINUOUSLY-VARIABLE-RATIO BELT DRIVE ASSEMBLY

(75) Inventors: Gianni Borghi, Albinea (IT); Giorgio Bordini, Formigine (IT)

(73) Assignee: Lombardini S.r.l., Reggio Emilia (IT)

( * ) Notice: Subject to any disclaimer, the term of this patent is extended or adjusted under 35 U.S.C. 154(b) by 0 days.

(21) Appl. No.: 09/866,860

(22) Filed: May 29, 2001

(65) Prior Publication Data

US 2002/0017440 A1 Feb. 14, 2002

(30) Foreign Application Priority Data

May 29, 2000 (IT) ........................ RE00A0059

(51) Int. Cl.$^7$ ................................ F16H 9/18
(52) U.S. Cl. ...................... 474/37; 474/8; 192/3.54
(58) Field of Search .................. 474/8, 29, 30, 474/31, 37, 46; 192/3.51–3.63

(56) References Cited

U.S. PATENT DOCUMENTS

| | | | | |
|---|---|---|---|---|
| 2,734,390 A | * | 2/1956 | Thelander | 474/37 |
| 2,769,345 A | * | 11/1956 | Bugenhagen | 474/29 |
| 3,893,343 A | * | 7/1975 | Zaiser et al. | 474/12 |
| 4,119,326 A | * | 10/1978 | Porter | 280/230 |
| 4,345,664 A | * | 8/1982 | Anno et al. | 180/230 |
| 4,364,735 A | * | 12/1982 | Plamper et al. | 474/14 |
| 4,760,757 A | | 8/1988 | Svab | 74/689 |
| 4,869,706 A | * | 9/1989 | Miyata et al. | 474/8 |
| 5,644,202 A | | 7/1997 | Toriyama et al. | 318/369 |

FOREIGN PATENT DOCUMENTS

| | | | |
|---|---|---|---|
| EP | 0982512 | 3/2000 | |
| GB | 1926886 | 5/1963 | |
| JP | 58-46249 | * 3/1983 | F16H/9/18 |
| JP | 58-46250 | * 3/1983 | F16H/9/18 |
| JP | 60-136653 | * 7/1985 | F16H/9/12 |

OTHER PUBLICATIONS

Patent Abstract of Japan Publication No. 6013663 Dated Jul. 20, 1985.

* cited by examiner

Primary Examiner—Thomas R. Hannon
Assistant Examiner—Timothy McAnulty
(74) Attorney, Agent, or Firm—Ladas & Parry

(57) ABSTRACT

The drive assembly has: an input member and an intermediate shaft; an axial clutch device for connecting the input member and the intermediate shaft in rotary manner; and a pulley connected in rotary manner to the intermediate shaft and defined by two half-pulleys movable axially with respect to each other and engaging a drive belt, the distance between the half-pulleys determining the winding radius of the belt. A push member, movable axially, along the intermediate shaft, between two limit positions, exerts thrust on the two half-pulleys to determine, in direct relation with its own axial position, the axial distance between the two half-pulleys, and alternatively exerts thrust on the clutch device to release the clutch device when moved axially in the direction increasing the distance between the half-pulleys. A control device is also provided to vary, on command, the axial position of the push member.

10 Claims, 4 Drawing Sheets

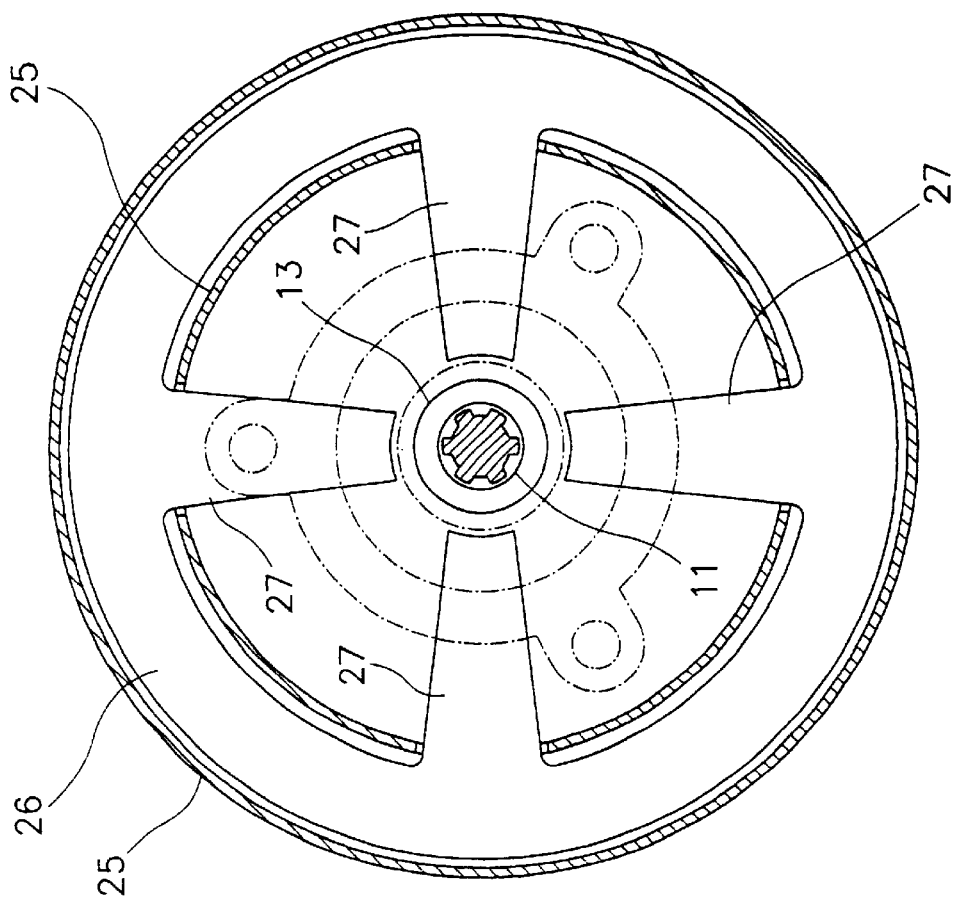
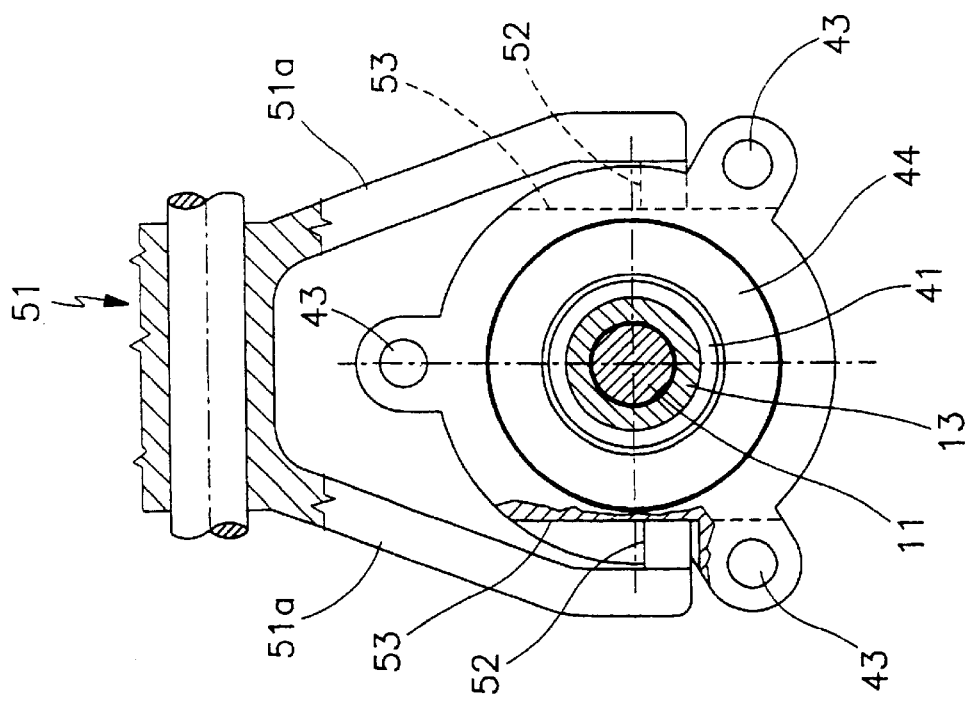

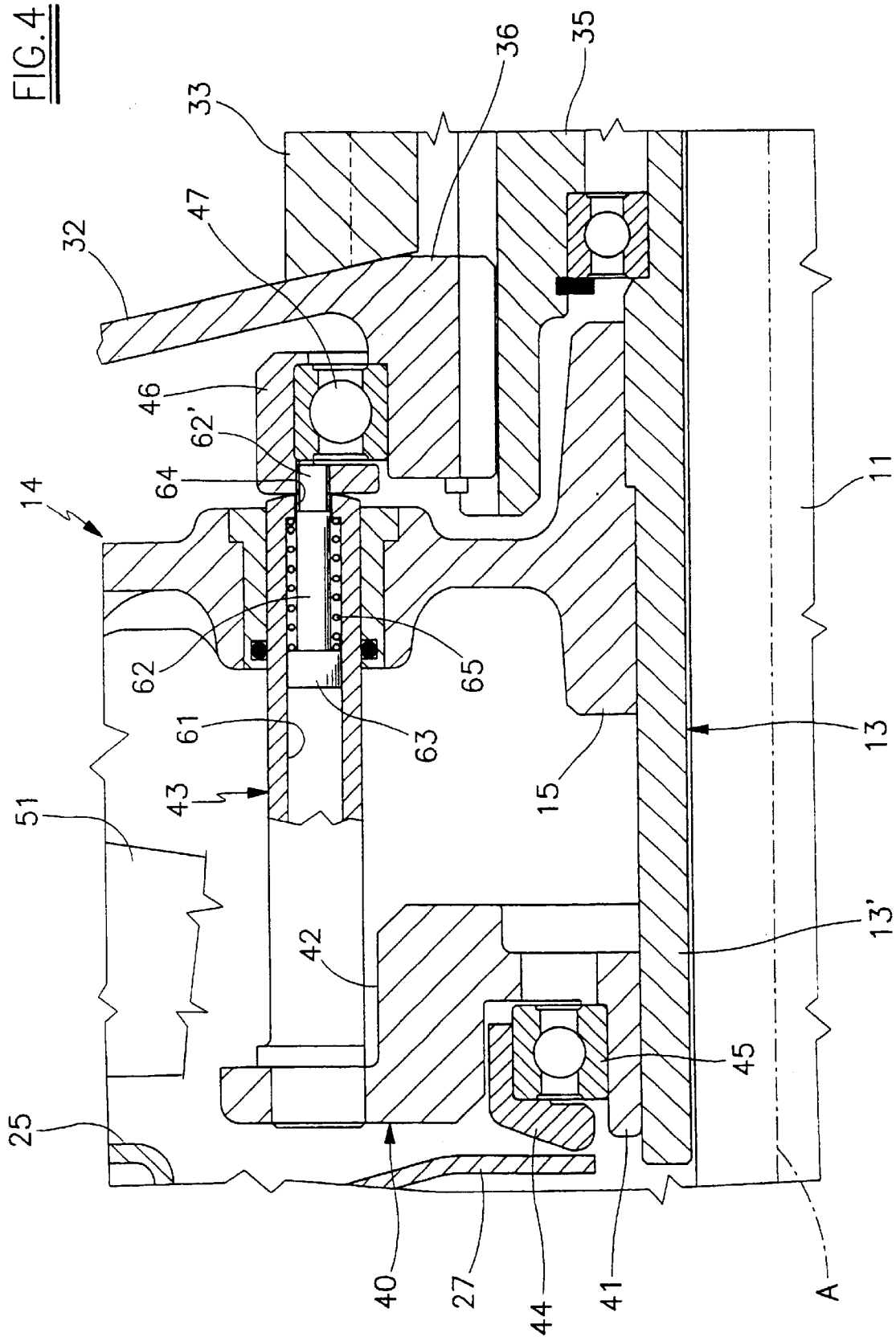

CONTINUOUSLY-VARIABLE-RATIO BELT DRIVE ASSEMBLY

The present invention relates to a continuously-variable-ratio belt drive assembly.

The present invention may be used to advantage, though not exclusively, on internal combustion engine motor vehicles, particularly low-power types such as micro- or so-called utility vehicles.

BACKGROUND OF THE INVENTION

In such vehicles, the velocity ratio between the engine and the wheels must be varied to adapt the output power of the engine to operating characteristics such as desired vehicle speed, vehicle load, etc.

Consequently, such vehicles traditionally feature, between the engine and the wheels, a drive comprising a variable-speed belt drive and possibly also a centrifugal clutch device fitted between the input member and the intermediate shaft, and wherein the two shafts are engaged by greatly increasing engine speed, and the velocity ratio is varied as a function of ultimate engine speed.

Known assemblies of this sort have the drawback of being fairly rigid in terms of both engagement and velocity ratio variation, and of normally requiring a high engine speed to fully engage the clutch device, thus dissipating a considerable amount of energy. Moreover, engagement is invariably rough, thus resulting in discomfort to the user.

SUMMARY OF THE INVENTION

It is an object of the present invention to eliminate the aforementioned drawbacks by providing a continuously-variable-ratio belt drive assembly wherein engagement of the clutch device is smooth and not necessarily produced by increasing engine speed, and wherein the velocity ratio in use is determined, not rigidly by the speed of the engine, but by an external control.

It is a further object of the invention to provide a drive assembly having the above characteristics, and which is also designed to afford substantial advantages in terms of maintenance and operation of the assembly itself.

These and other objects are achieved by the present invention as characterized in the accompanying claims.

BRIEF DESCRIPTION OF THE DRAWINGS

A non-limiting embodiment of the invention will be described by way of example with reference to the accompanying drawings, in which:

FIG. 2 shows a section along line II—II in FIG. 1;

FIG. 3 shows a section along line III—III in FIG. 1;

FIG. 4 shows an enlarged detail of FIG. 1A relative to an alternative embodiment of pin 43.

DETAILED DESCRIPTION OF THE INVENTION

Figure 1:
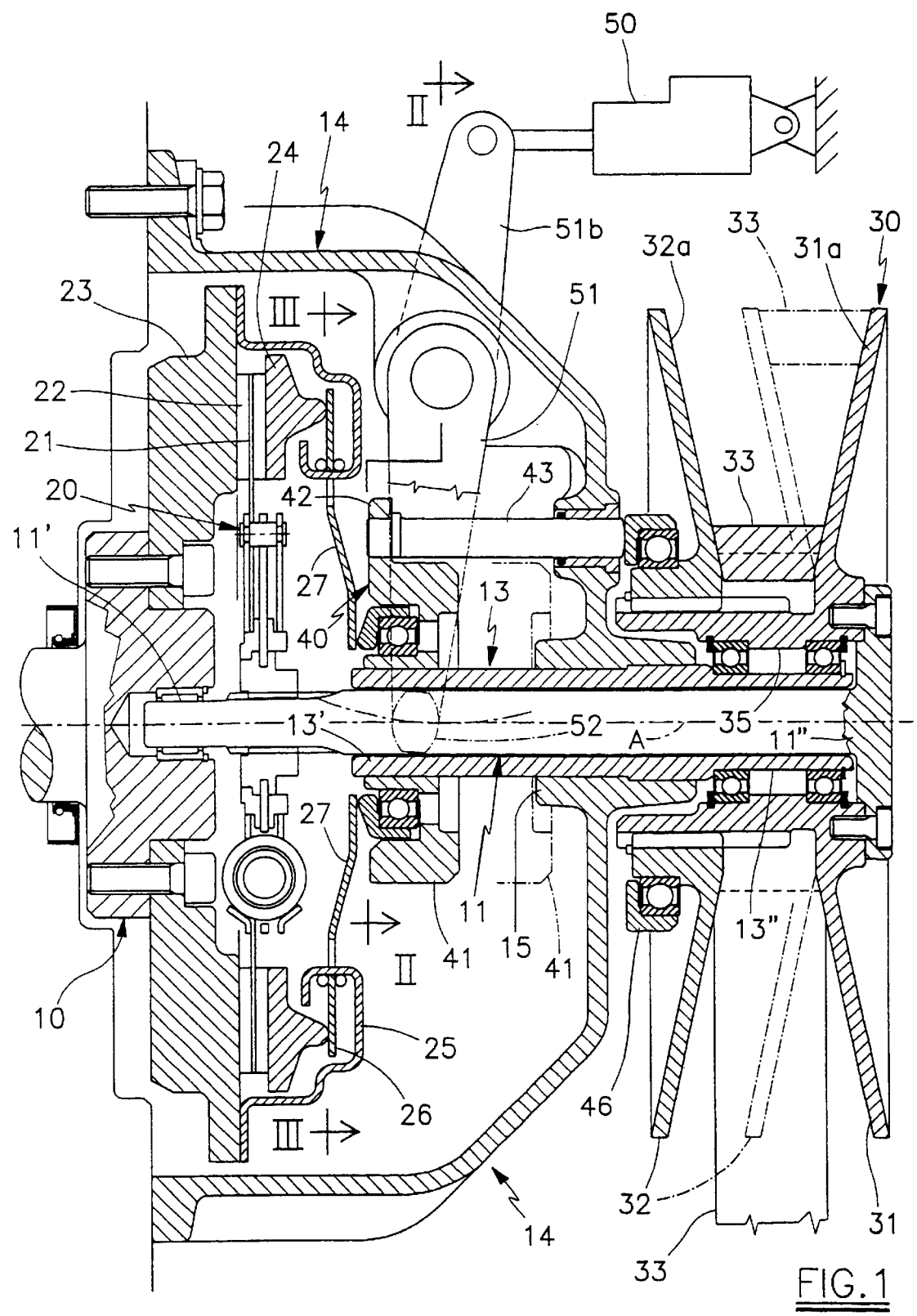
FIG. 1 shows an axial section of the assembly.

The assembly shown is fitted to an input member 10 (e.g. the drive shaft flywheel) powered by the vehicle engine, having an axis A, and connectable for rotation to an intermediate shaft 11 by means of a clutch device 20. More specifically, intermediate shaft 11 is coaxial with input member 10, and has a first end 11' facing and connected to one end of input member 10 by clutch device 20, which is normally in the engaged configuration.

A pulley 30 is fitted for rotation to intermediate shaft 11, and is defined by two half-pulleys 31, 32, which are movable axially with respect to each other, engage a drive belt 33, and the distance between which determines the winding radius of belt 33 about pulley 30. The assembly comprises a casing 14 housing clutch device 20; pulley 30 is located outside casing 14; and intermediate shaft 11 is inserted inside and supported by a fixed sleeve 13 connected integrally to casing 14 and fitted through a seat 15 formed through the wall of the casing.

Sleeve 13 comprises a first portion 13' projecting inside casing 14 and having a smooth cylindrical outer surface; and a second portion 13" projecting outwards of casing 14.

Both ends of shaft 11 project from sleeve 13; a first end 11' projects from first portion 13' and is located close to input member 10; and a second end 11" projects from second portion 13", and rotates pulley 30.

More specifically, half-pulley 31 is fitted integrally to second end 11" of intermediate shaft 11; whereas half-pulley 32 is located closer to the center portion of shaft 11 and is movable axially while rotating with shaft 11.

The active inner surfaces 31a and 32a of half-pulleys 31 and 32 are truncated-cone-shaped, diverge outwards, and engage drive belt 33. Since the section of belt 33 is practically undeformable, the radial position of the belt section and, hence, the winding radius of belt 33 about the pulley can be varied by varying the distance between surfaces 31a and 32a.

Belt 33 also extends about a known driven pulley (not shown) for rotating a driven shaft, and which is also defined by two half-pulleys movable axially to and from each other to complement the movement of half-pulleys 31 and 32 and so keep belt 33 (which is inextensible) taut.

More specifically, pulley 30 comprises a main hub 35, to which half-pulleys 31 and 32 are fitted, and which is fitted coaxially to and supported on the outer surface of second portion 13" of sleeve 13 so as to rotate idly (by means of bearings 35a).

Hub 35 is connected integrally to second end 11", of intermediate shaft 11 and to the outer half-pulley 31; whereas the inner half-pulley 32 has a hub 36 of its own, which is fitted to hub 35 by means of teeth and respective axial grooves allowing hub 36 to move axially with respect to, while being rotated by, hub 35.

Clutch device 20 comprises a disk 21 fitted to first end 11' of shaft 11 and supporting two peripheral elements 22, which form an annular rim of high-friction material, and are housed between two opposite, also annular, jaws 23 and 24. Both jaws 23 and 24 are fitted to and rotate integrally with input member 10, jaw 23 being axially fixed, and jaw 24 being allowed small axial movements. Jaw 24 is enclosed in an annular housing 25 made of shaped sheet metal, fixed to the periphery of fixed jaw 23, and to which jaw 24 is connected in axially movable manner. Jaw 24 is normally pushed towards jaw 23 by an annular leaf spring 26 fitted to housing 25 and which acts on the back of jaw 24 (like a Belleville washer). A number of radial projections 27 extend from spring 26 towards the center, are formed in one piece with the spring, and the free ends of which are located close to intermediate shaft 11.

Spring 26 normally holds jaws 23 and 24 against annular rim 22, so that it rotates integrally, and clutch device 20 is therefore set to the engaged configuration (in which input member 10 rotates intermediate shaft 11).

Sleeve 13, in particular the outer surface of first portion 13', is fitted with a push member 40 movable axially along intermediate shaft 11 between two limit positions. Push member 40 exerts thrust on movable half-pulley 32 to determine the axial distance between half-pulleys 31 and 32 in direct relation to its own axial position, or acts on clutch device 20 to release it when moved axially in the direction (towards input member 10) increasing the distance between half-pulleys 31 and 32.

More specifically, push member 40 comprises an annular body 41 fitted coaxially to sleeve 13, sliding along the outer surface of first portion 13', and having a radial flange 42 supporting a number of projecting cylindrical pins 43, which are parallel to axis A, extend towards pulley 30, are fitted to size and in sliding manner through respective holes 14a in casing 14, and the respective free ends of which project from casing 14 to exert thrust on movable half-pulley 32. More specifically, the free ends of pins 43 rest on a ring 46 fitted to hub 36 of movable half-pulley 32 via the interposition of an antifriction bearing 47.

The end of annular body 41 facing input member 10 is fitted, via the interposition of an antifriction bearing 45, with a ring 44 for axially engaging the free ends of radial projections 27 of clutch device 20 to release the clutch device.

When annular body 41 is moved axially towards input member 10 so that the ends of projections 27 are moved accordingly with respect to their normal position, projections 27 act as levers which, pivoting about the point of connection to housing 25, deform spring 26 to detach the spring from movable jaw 24 so that jaws 23 and 24 are no longer integral with disk 21.

When push member 40 is moved axially towards second end 11" of shaft 11 (rightwards in FIG. 1), the distance between half-pulleys 31 and 32 is reduced and the winding radius of belt 33 is increased. And, conversely, when push member 40 is moved axially towards first end 11' (leftwards), the distance between half-pulleys 31 and 32 is increased and the winding radius of belt 33 is reduced.

Figure 1A:
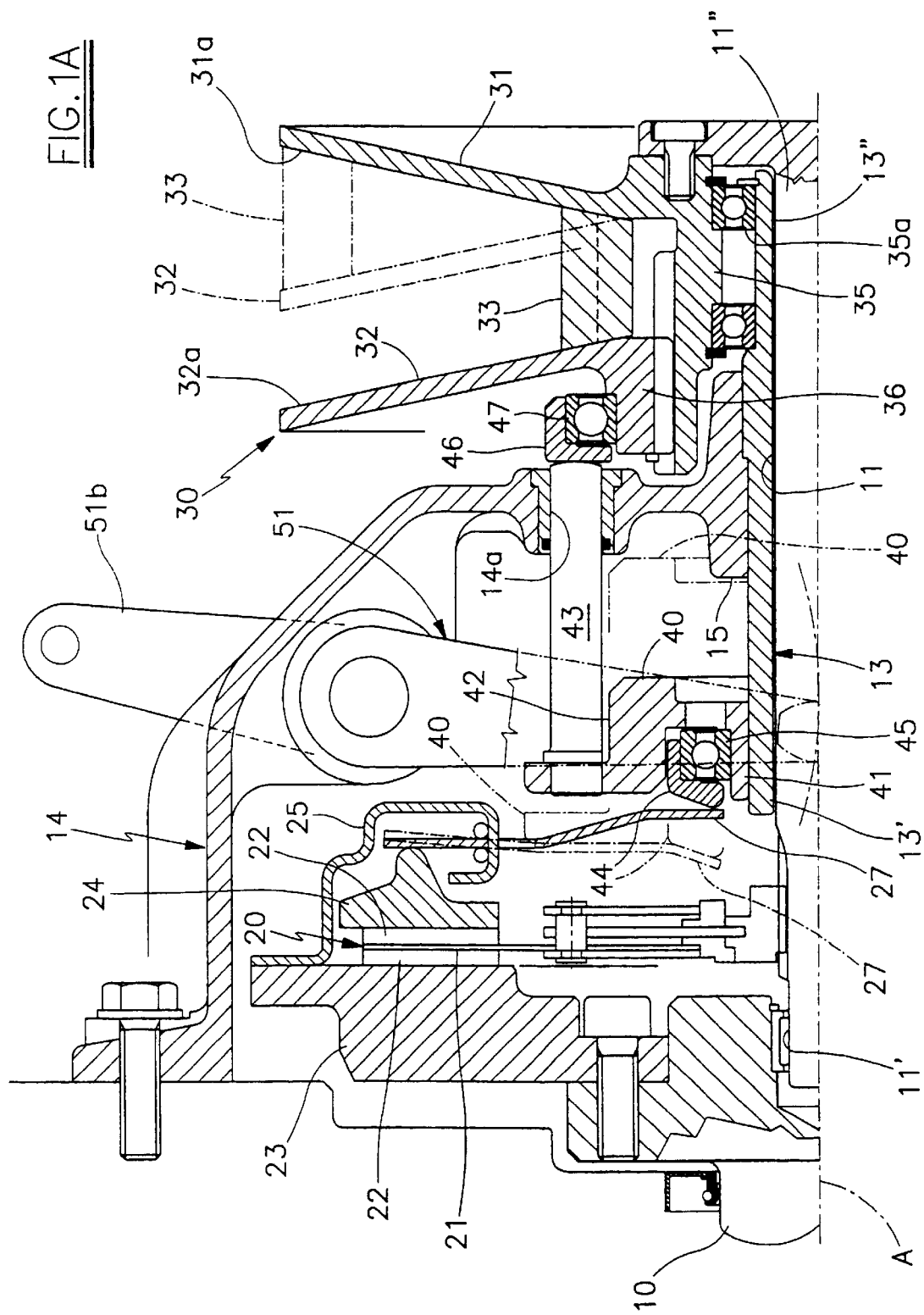
FIG. 1A shows an enlarged detail of FIG. 1.

Push member 40 is movable axially between a first limit position corresponding to maximum travel of the push member towards first end 11' of shaft 11, and a second limit position corresponding to maximum travel of the push member towards second end 11", and is so related geometrically to pulley 30 and clutch device 20 that the axial position of push member 40 with respect to intermediate shaft 11 determines the distance between half-pulleys 31 and 32, so that, in the first limit position (elements 44, 26, 27, 40 shown by the dot-and-dash lines in FIG. 1A), the push member releases clutch device 20 and produces the maximum distance between half-pulleys 31 and 32, and, in the second limit position (movable half-pulley 32 and belt 33 shown by the dot-and-dash lines in FIGS. 1 and 1A), the push member produces the minimum distance between half-pulleys 31 and 32 and engages clutch device 20.

More specifically, in the first limit position, push member 40 is detached from movable half-pulley 32, which thus moves the maximum distance from half-pulley 31; and, when moved slightly rightwards from the first limit position, the push member contacts movable half-pulley 32.

The invention also comprises a control device 50 for determining, on command, the axial position of push member 40 along sleeve 13. More specifically, push member 40 is activated by a lever 51 hinged to casing 14 of the drive assembly, and the bottom portion of which comprises two arms 51a, the ends of which inside casing 14 support two cylindrical projections 52 engaging a track 53 formed on annular body 41.

The top portion 51b of lever 51 is located outside casing 14 and connected to control device 50, which provides for controlling the angular position of lever 51 and, via lever 51, the axial position of annular body 41. The control device may be defined by a linear actuator or other devices, e.g. may be operated manually, electrically, hydraulically, etc., providing it moves annular body 41, on command, into any axial position between said two limit positions.

By means of control device 50, the axial position of member 40 can be controlled as required.

In actual use, push member 40 is initially set to the first limit position acting on clutch device 20, and wherein input member 10 and shaft 11 are disconnected, half-pulleys 31 and 32 are the maximum distance apart so that belt 33 is the minimum distance from axis A, and the vehicle engine is disconnected from the wheels (is in neutral) so that the vehicle is stationary.

Conversely, when push member 40 is moved towards second end 11" (rightwards) by control device 50, clutch device 20 first engages gradually to connect the wheels and the engine gradually while the engine is (advantageously) at low speed. As push member 40 continues moving, following engagement of the clutch device, half-pulleys 31 and 32 are gradually brought closer together so as to accordingly increase the winding radius of belt 33 with respect to axis A, and so increase the velocity ratio (and the rotation speed of the driven pulley, for a given engine speed) to a maximum value by the time push member 40 reaches the second limit position.

Conversely, as push member 40 is restored to the first limit position, the velocity ratio (and hence vehicle speed) is reduced, and, on reaching the minimum velocity ratio, clutch device 20 is released (typically, at minimum engine speed) and the vehicle stops.

In each case, each axial position of member 40 corresponds, biuniquely and according to a continuous linear function, to a given velocity ratio; and the clutch device is advantageously engaged and released at minimum engine speed.

Controlling the axial position of member 40 as required by means of control device 50, the assembly according to the invention provides for extremely flexible velocity ratio control, regardless of engine speed. In particular, the velocity ratio may be controlled as required to selectively adapt vehicle performance to the engine, load or road conditions. Moreover, a major advantages lies in the clutch device being engaged and released at minimum engine speed.

Control device 50 may typically comprise hand- or pedal-operated means for moving member 40 (manual transmission).

A major design advantage of the assembly according to the invention lies in pulley 30 being located outside, and supported in projecting manner with respect to, casing 14, thus providing for troublefree inspection and also simplifying maintenance and part replacements, particularly of the belt.

Belt 33 is also well ventilated, thus extending its working life.

Pins 43 may conveniently be located some distance from axis A, so as to balance as far as possible the eccentric axial thrust of belt 33 axially affecting movable half-pulley 32. Projections 52 are also appropriately located beneath axis A for the same reason.

In the alternative embodiment shown in FIG. 4, pins 43 provide for transmitting to movable half-pulley 32 a rigid movement in the direction reducing the distance between movable half-pulley 32 and fixed half-pulley 31, and a rigid movement, but with an elastic portion, in the direction increasing the distance between movable half-pulley 32 and fixed half-pulley 31, so as to allow extra travel of member 40 to release and engage device 20.

More specifically, each pin 43 has a cylindrical inner chamber 61 housing an axial rod 62, the inner end of which is fitted with a body 63 sliding axially inside chamber 61. Rod 62 projects from the front end of pin 43 through a hole 64 smaller in diameter than chamber 61; the outer end 62' of rod 62 is fixed integrally to ring 46, which rests, axially retained in both directions, on bearing 47; and chamber 61 houses a spring 65 precompressed between body 63 and the front-end wall of pin 43 in which hole 64 is formed.

When push member 40 is moved (rightwards) towards second end 11" of shaft 11, pins 43 push movable half-pulley 32 rigidly in the direction reducing the distance between movable half-pulley 32 and fixed half-pulley 31. Conversely, when push member 40 is moved in the opposite direction (leftwards), pins 43 pull movable half-pulley 32, practically rigidly (by virtue of the preload of spring 65), in the direction increasing the distance between movable half-pulley 32 and fixed half-pulley 31. As movable half-pulley 32 reaches the maximum possible distance from fixed half-pulley 31, however, spring 65 can be compressed to allow further travel of member 40 leftwards to release clutch device 20 (or rightwards to engage clutch device 20).

By means of this solution, member 40 provides, not only for positively bringing together, but also positively parting half-pulleys 31 and 32. For example, in the event the drive is suddenly arrested with the half-pulleys relatively far apart, the drive would have to be put through at least a few revolutions at the next start-up to release the movable half-pulley 32 locked by the asymmetrical thrust of belt 33. With the above solution, however, the distance between the half-pulleys is reduced positively, and therefore in controlled manner at all times, by the movement of member 40.

Any problems caused by slippage of the movable half-pulley, due to wear, dirt, etc., are also solved.

Clearly, changes may be made to invention as described and illustrated herein without, however, departing from the scope of the accompanying claims.

What is claimed is:

1. A continuously-variable-ratio belt drive assembly comprising:

an input member (10) and an intermediate shaft (11);

an axial clutch device (20) for connecting the input member (10) and the intermediate shaft (11) in rotary manner; and a pulley (30) connected in rotary manner to the intermediate shaft (11) and defined by two half-pulleys (31, 32) movable axially with respect to each other and engaging a drive belt (33); the distance between the half-pulleys (31, 32) determining the winding radius of the belt (33);

characterized by also comprising:

a push member (40) movable axially, along the intermediate shaft (11), between two limit positions, and which exerts thrust on the two half-pulleys (31, 32) to determine, in direct relation with its own axial position, the axial distance between the two half-pulleys, and which alternatively exerts thrust on the clutch device (20) to release the clutch device when moved axially in the direction increasing the distance between the half-pulleys (31, 32); and a control device (50) for varying, on command, the axial position of the push member (40).

2. A drive assembly as claimed in claim 1, characterized by comprising:

a casing (14) enclosing the clutch device, whereas the pulley (30) is located outside the casing;

a sleeve (13) fixed to the casing (14) and supporting the intermediate shaft (11) inserted coaxially inside the sleeve with both ends projecting outwards of the sleeve (13), a first end (11') being housed inside the casing (14) and facing the input member (10), and a second end (11") being located outside the casing (14) and rotating with said pulley (30);

said push member (40) being located on, and being movable coaxially with respect to, the sleeve (13).

3. A drive assembly as claimed in claim 2, characterized in that:

said sleeve (13) comprises a first portion projecting inside the casing (14) and having a cylindrical outer surface;

said push member (40) comprises an axially annular body (41), which is coaxial with the sleeve (13), slides on the outer surface of the first portion of the sleeve (13), and supports a number of projecting pins (43) parallel to the axis (A), extending towards the pulley (30), and the free ends of which are located outside the casing (14) and exert thrust on the movable half-pulley (32).

4. A drive assembly as claimed in claim 3, characterized in that the end of the annular body (41) facing the input member (10) is fitted, via the interposition of an antifriction bearing (45), with a ring (44) which axially engages the free ends of radial projections (27) of the clutch device (20) to release the clutch device.

5. A drive assembly as claimed in claim 3, characterized in that said pins (43) transmit to the movable half-pulley (32) a rigid movement in the direction reducing the distance between the movable half-pulley and the fixed half-pulley (31), and a rigid movement, but with an elastic portion, in the direction increasing the distance between the movable half-pulley and the fixed half-pulley (31).

6. A drive assembly as claimed in claim 2, characterized in that said sleeve (13) comprises a second portion (13") projecting outwards of the casing (14); and the pulley (30) comprises a hub (35), which is fitted coaxially to the outer surface of, and supported by, the second portion (13") of the sleeve (13), and in turn supports the half-pulleys (31, 32); said hub (35) being connected integrally to the second end (11") of the intermediate shaft (11).

7. A drive assembly as claimed in claim 1, characterized in that said push member (40) is so related geometrically to the pulley (30) and to the clutch device (20) that the axial position of the push member with respect to the intermediate shaft (11) determines the distance between the half-pulleys (31, 32), so that, in a first limit position, the push member (40) releases the clutch device (20) and produces the maximum distance between the half-pulleys (31, 32), and, in a second limit position, the push member produces the minimum distance between the half-pulleys (31, 32), the clutch device (20) being engaged.

8. A drive assembly as claimed in claim 1, characterized in that the intermediate shaft (11) is coaxial with the input member (10), and has a first end connected to the input member (10) by the clutch device (20); and the clutch device (20) is normally engaged, and is released by an axial movement of the push member (40) towards the input member (10).

9. A drive assembly as claimed in claim 8, characterized in that said pulley (30) comprises a half-pulley (31) integral with the intermediate shaft (11) and fitted to the second end (11") of the intermediate shaft, and a half-pulley (32) movable axially along the intermediate shaft (11); said push member (40) being brought into contact with the movable half-pulley (32) when moved away from the first limit position, the clutch device (20) being engaged.

10. A drive assembly as claimed in claim 9, characterized in that said push member (40) is activated by a lever (51) hinged to the casing (14) and having one end outside the casing (14).

* * * * *